United States Patent [19]

Nagahara

[11] Patent Number: 6,104,553
[45] Date of Patent: Aug. 15, 2000

[54] IMAGE-FORMING LENS

[75] Inventor: Akiko Nagahara, Koshigaya, Japan

[73] Assignee: Fuji Photo Optical Co., Ltd., Omiya, Japan

[21] Appl. No.: 09/291,472

[22] Filed: Apr. 14, 1999

[30]     Foreign Application Priority Data

Apr. 14, 1998 [JP] Japan .................. H10-120081

[51] Int. Cl.[7] .............. G02B 15/14; G02B 9/04
[52] U.S. Cl. ............................ 359/793; 359/691
[58] Field of Search ................... 359/793, 794, 359/795, 691

[56]         References Cited

U.S. PATENT DOCUMENTS 5,619,380   4/1997   Ogasawara ................. 359/661
5,812,327   9/1998   Doh ........................... 359/793

FOREIGN PATENT DOCUMENTS 6-67089    3/1994   Japan .
7-50246    2/1995   Japan .
10-90597   4/1998   Japan .

Primary Examiner—Georgia Epps
Assistant Examiner—Michael A Lucas
Attorney, Agent, or Firm—Arnold International; Bruce Y. Arnold

[57]            ABSTRACT

An image-forming lens, of the retro-focus type, having only two lens elements is disclosed. By making the object-side of the first lens element, in order from the object side, be a convex surface, and by satisfying two specified conditions, an image forming lens having a wide image angle, low distortion, and with a sufficiently large back focus for insertion of other optical components between the lens and the image plane is achieved, while simultaneously providing a compact and low-cost lens construction. By making at least one surface of each lens element be aspherical, a high-quality image is provided. In the preferred embodiments disclosed, both surfaces of each lens element are made aspherical.

2 Claims, 9 Drawing Sheets

IMAGE-FORMING LENS

BACKGROUND OF THE INVENTION

Recently, there have been many products on the market which use solid state image sensors at the image-forming plane of various sorts of video cameras and electronic still cameras. Due to technological advancements, there has been a trend toward greater miniaturization and, accompanying this trend, smaller image-forming lenses with wider imaging angles have been required. Also, it is strongly desired that the smaller image-forming lenses provide a bright image (i.e., that the lenses have a low F-number, $F_{NO}$), and be low in cost. As such an image-forming lens, an image-forming lens having only two lens elements has previously been disclosed by this inventor (Japanese Laid Open Patent Application H09-25900). In this inventor's prior image-forming lens, the object-side surface of the first lens element in order from the object side (hereinafter termed the "first surface") is made to be concave.

On the other hand, because the trend in solid state image sensors has been toward higher image resolution with more pixels, imaging lenses having higher resolution are being demanded. Furthermore, because these cameras are now often used for recording written documents having lines of text with parallel borders in which lens distortion is particularly noticeable, it has become important to suppress distortion below an extremely low level while sultaneously providing a wide image angle. However, the above-mentioned lens having only two lens elements does not have a sufficiently small distortion to satisfy these demands.

Although the above-described patent application by the inventor of the present application employs a lens of only two lens elements in which the first surface is concave, the present invention employs a convex first surface. Four patent applications known to applicant, namely Japanese Laid Open Patent Applications H10-90597, H7-50246 and H6-67089, and U.S. Pat. No. 5,812,327, each disclose a lens having only two lens elements wherein a convex surface is employed for the first surface. However, the lens described in Japanese Laid Open Patent Application H7-50246 and the lens described in U.S. Pat. No. 5,812,327 each has large distortion. On the other hand, the lens described in Japanese Laid Open Patent Application H6-67089 has small distortion but a narrow image angle. Similarly, the lens described in Japanese Laid Open Patent Application H10-90597 has an image angle of only 50 degrees, as compared to the lens of the present invention which has an image angle above 60 degrees. Therefore, neither of these lenses is suitable for use with state-of-the-art image sensors in applications having an image angle of more than 50 degrees.

BRIEF SUMMARY OF THE INVENTION

This invention relates to an image-forming lens, especially an image-forming lens that is well-suited as an imaging lens for a TV telephone, a door phone, a surveyor video camera, and so on.

A first object of the present invention is to provide an image-forming lens having no more than two lens elements, thereby enabling miniaturization and manufacturing cost reduction. A second object of the invention is to provide such a lens with a low $F_{NO}$, thereby yielding a bright image A third object of the invention is to provide a wide image angle with low distortion.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

The image-forming lens of the present invention consists of, in order from the object side, a first lens element of negative refractive power having a meniscus shape with its convex surface on the object side, and a second lens element shaped as a biconvex lens. The imaging lens satisfies the following Condition (1):

$$-1.4 \leq f_1/f \leq -1.1 \qquad \text{Condition (1)}$$

where $f_1$ is the focal distance of the first lens element, f is the focal distance of the lens.

Also, it is preferred that the lens be constructed so that the following Condition (2) is satisfied $$0.55 \leq D_1/f \leq 1.2 \qquad \text{Condition (2)}$$

where $D_1$ is the center thickness of the first lens element, and f is as defined above.

Furthermore, it is preferable for correcting numerous aberrations that at least one surface of each of the two lens elements be aspherical.

Figure 1:
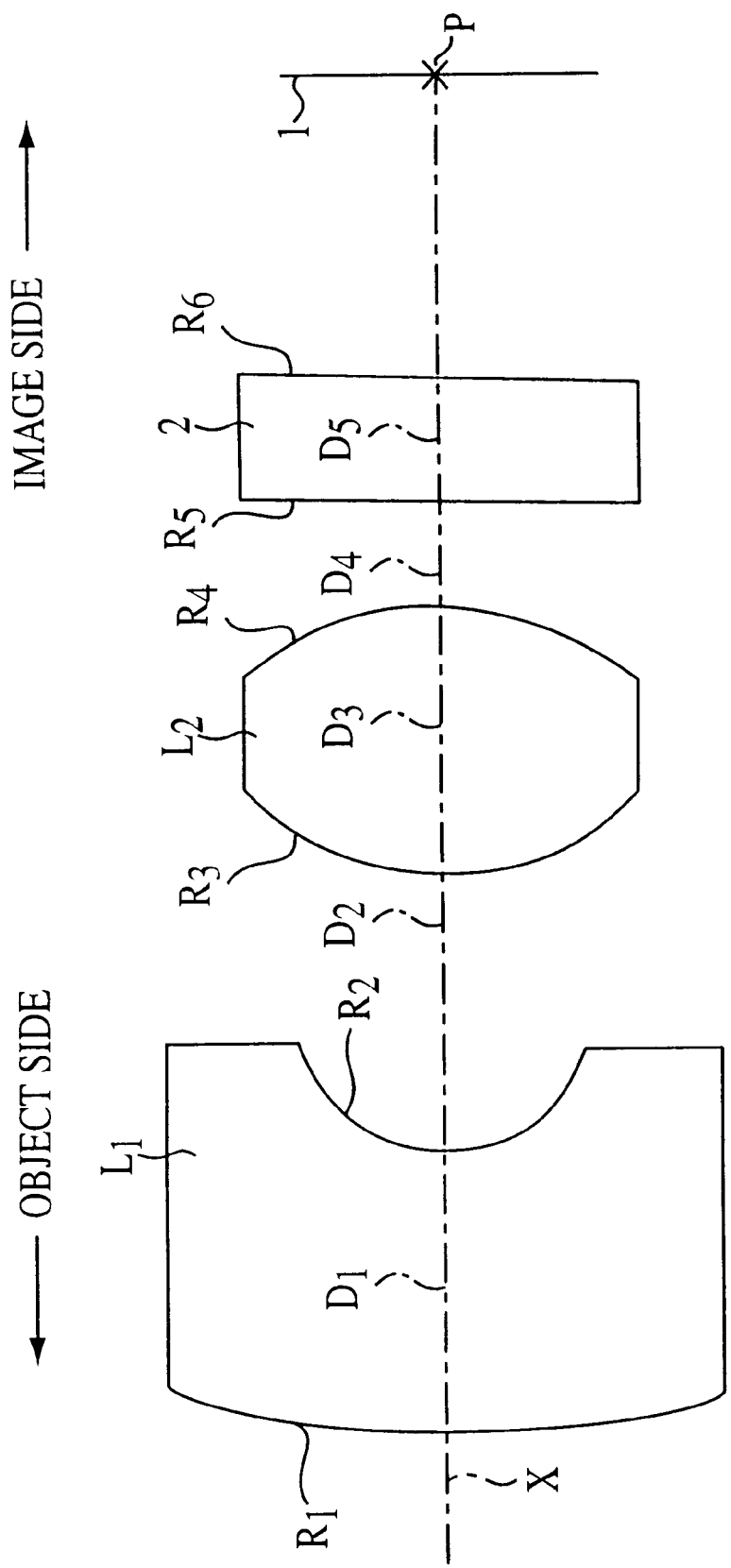
FIG. 1 shows the basic lens element construction of the invention.
Figure 2:
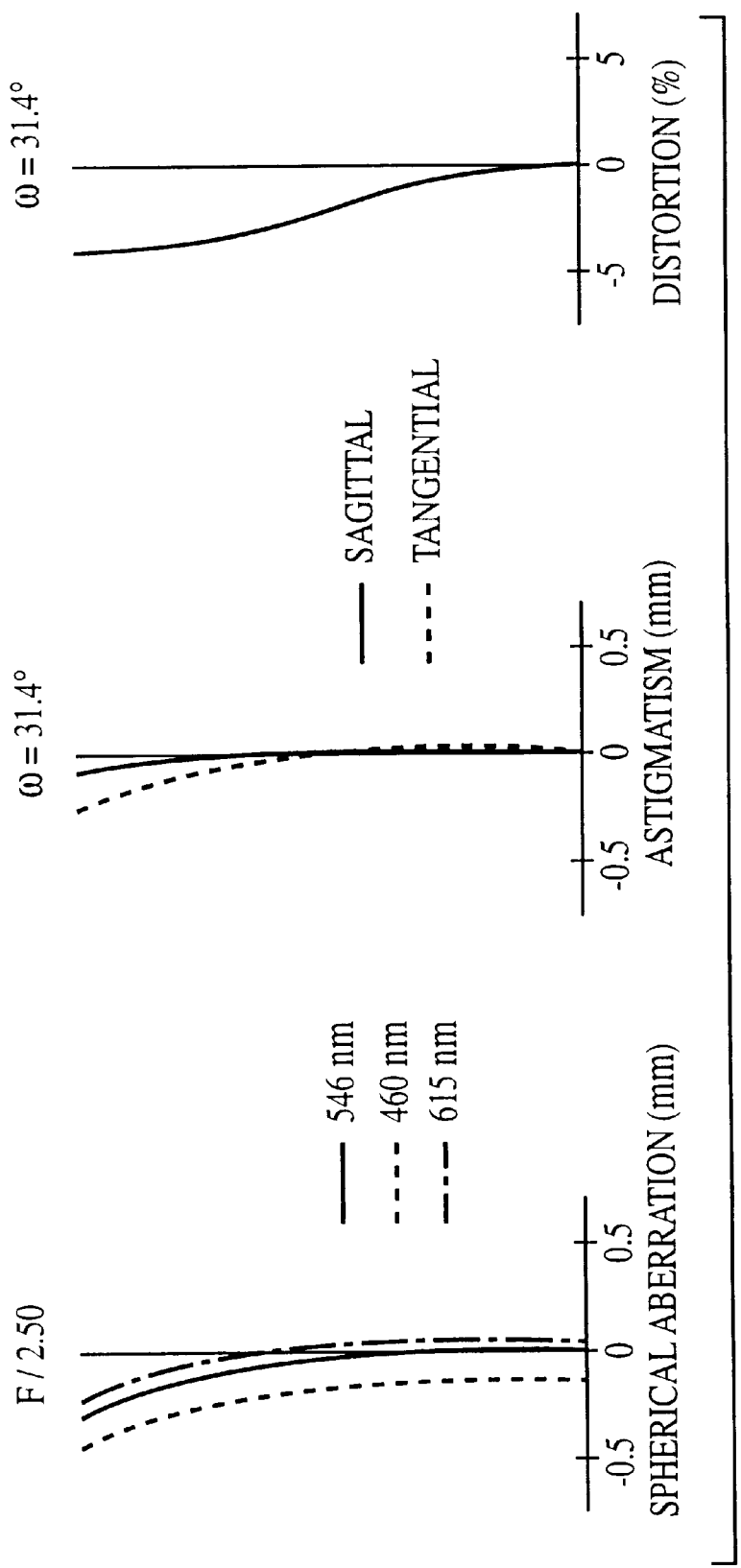
FIG. 2 shows the spherical aberration, astigmatism, and distortion for the lens of the Embodiment 1.
Figure 3:
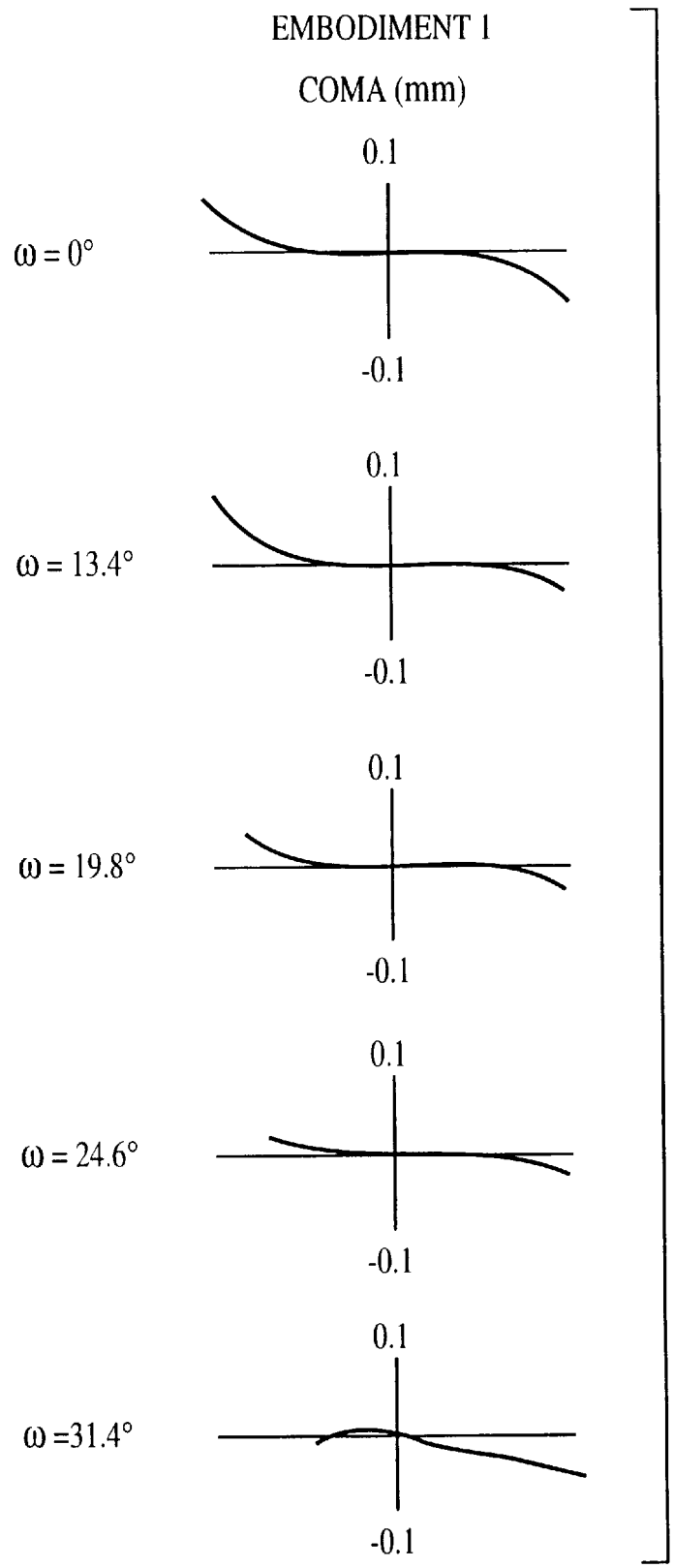
FIG. 3 shows the coma of the lens of Embodiment 1 at various half-image angles ω.
Figure 4:
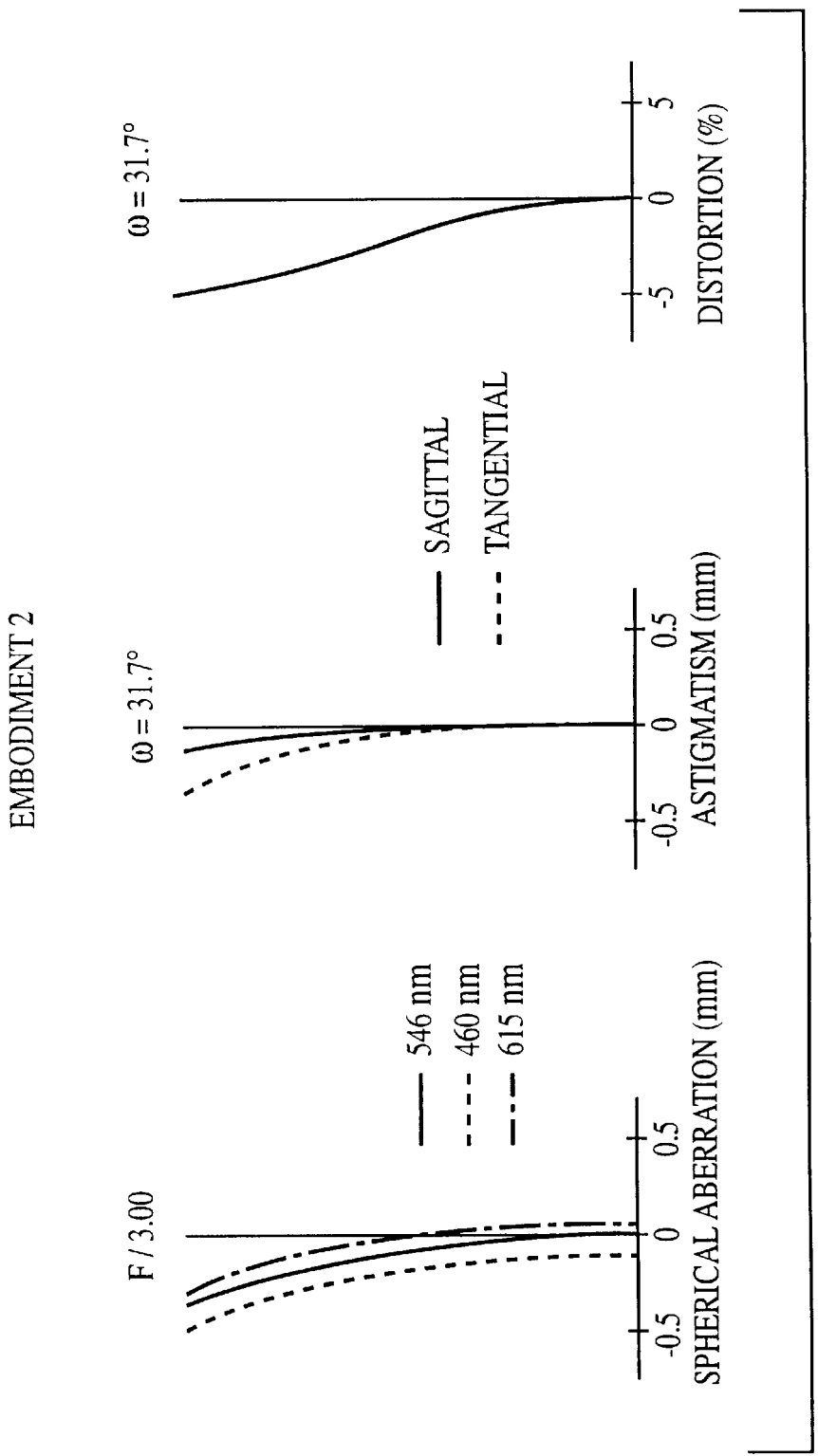
FIG. 4 shows the spherical aberration, astigmatism, and distortion for the lens of the Embodiment 2.
Figure 5:
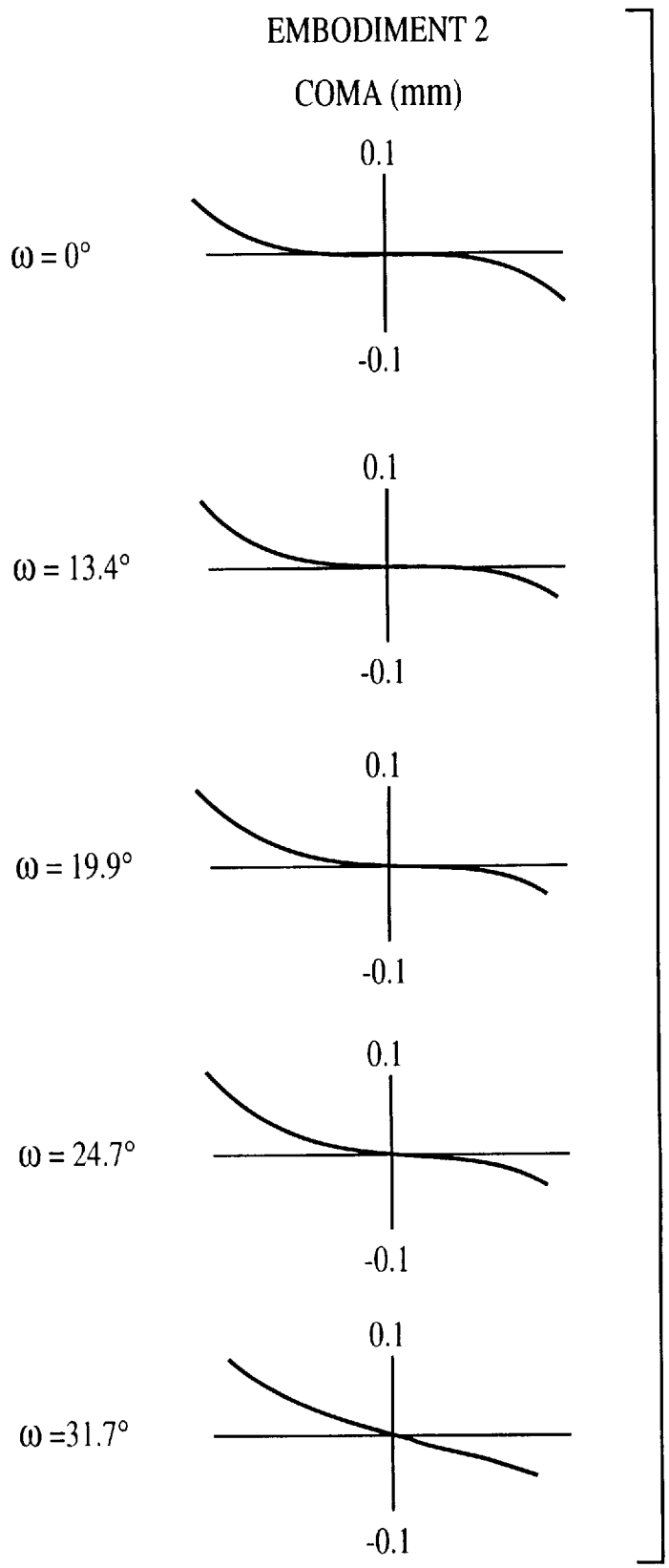
FIG. 5 shows the coma of the lens of Embodiment 2 at various half-image angles ω.
Figure 6:
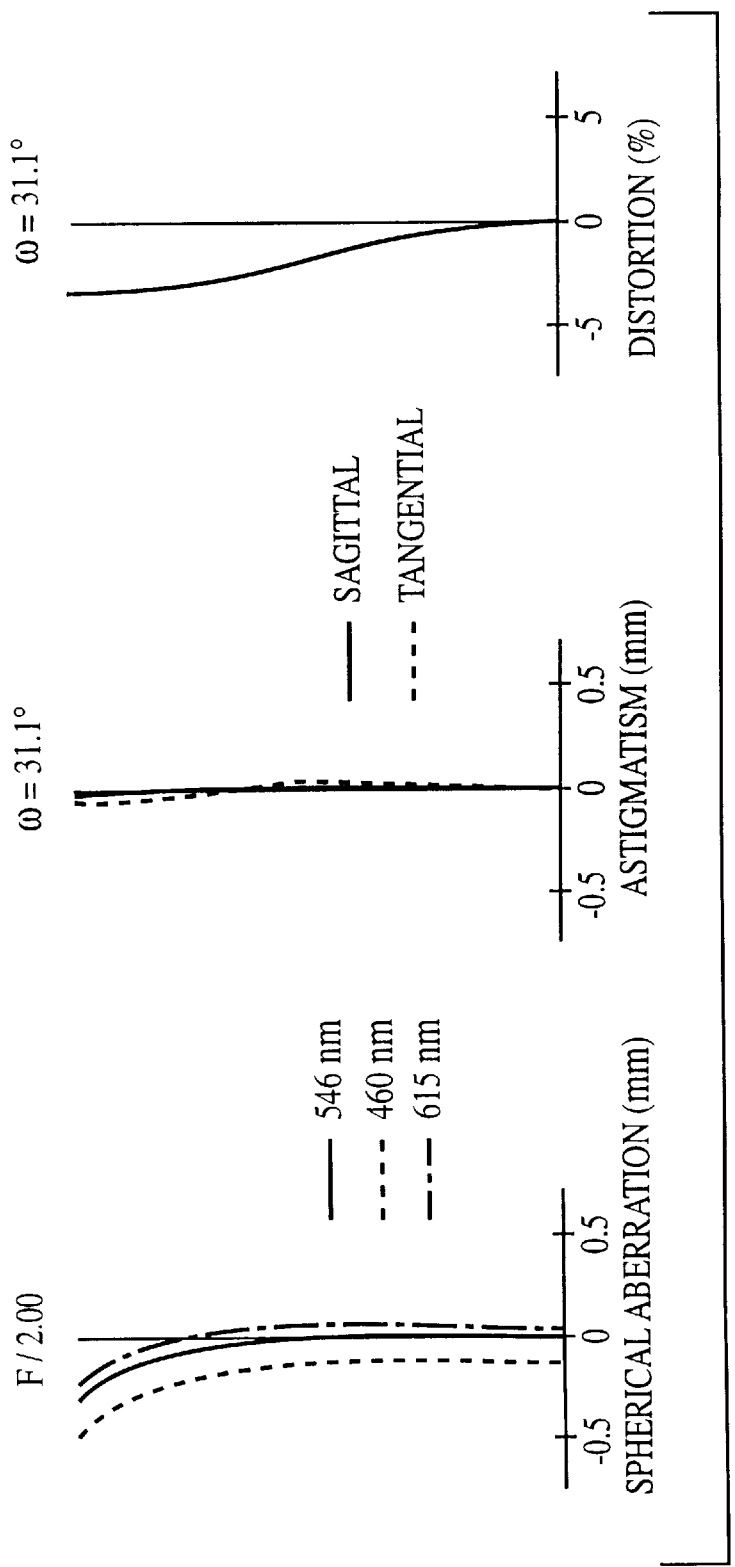
FIG. 6 shows the spherical aberration, astigmatism, and distortion for the lens of the Embodiment 3.
Figure 7:
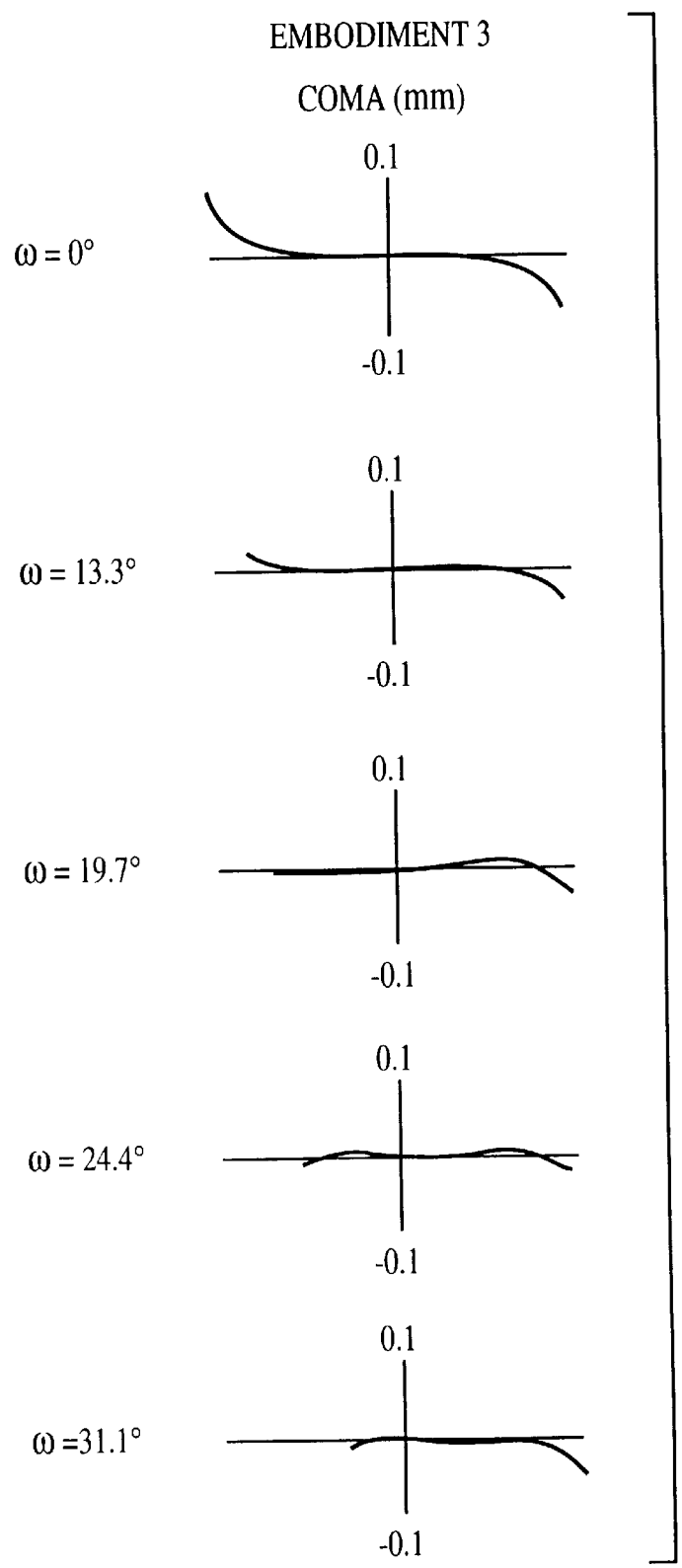
FIG. 7 shows the coma of the lens of Embodiment 3 at various half-image angles ω.
Figure 8:
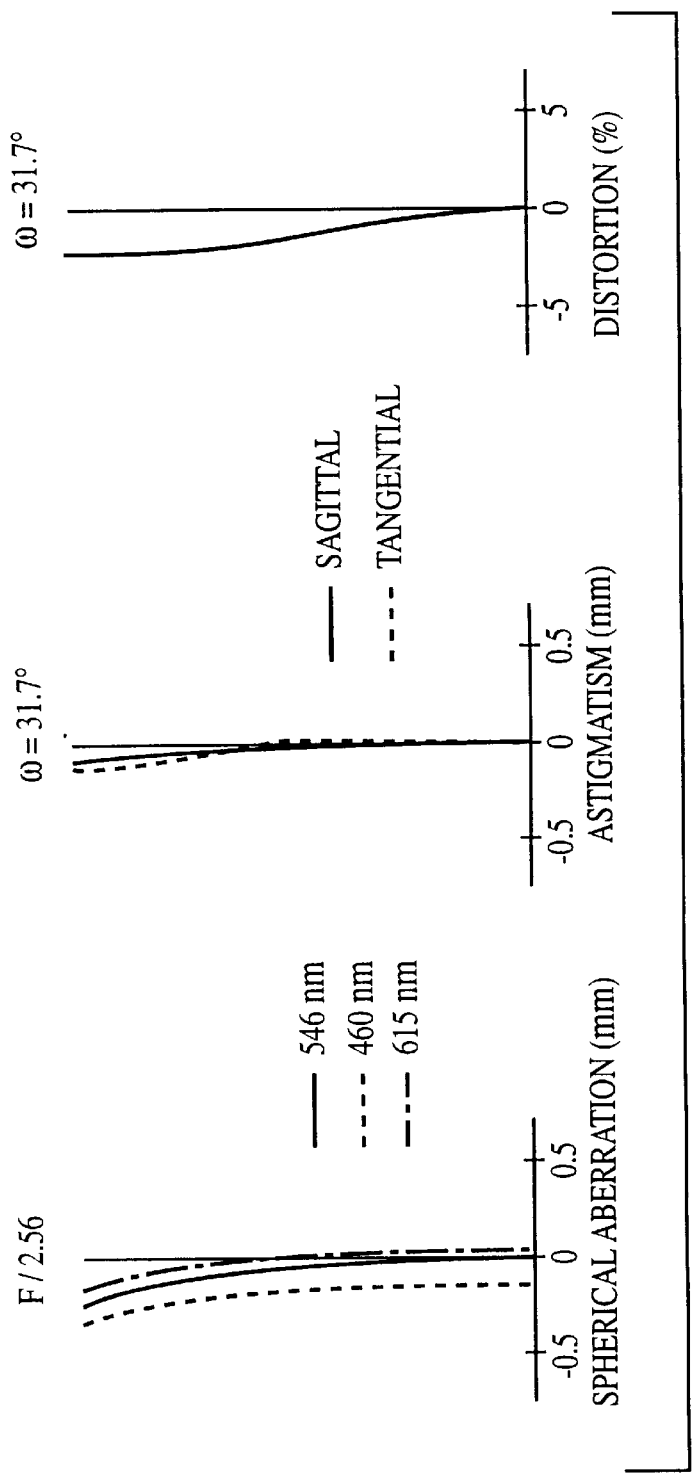
FIG. 8 shows the spherical aberration, astigmatism, and distortion for the lens of the Embodiment 4.
Figure 9:
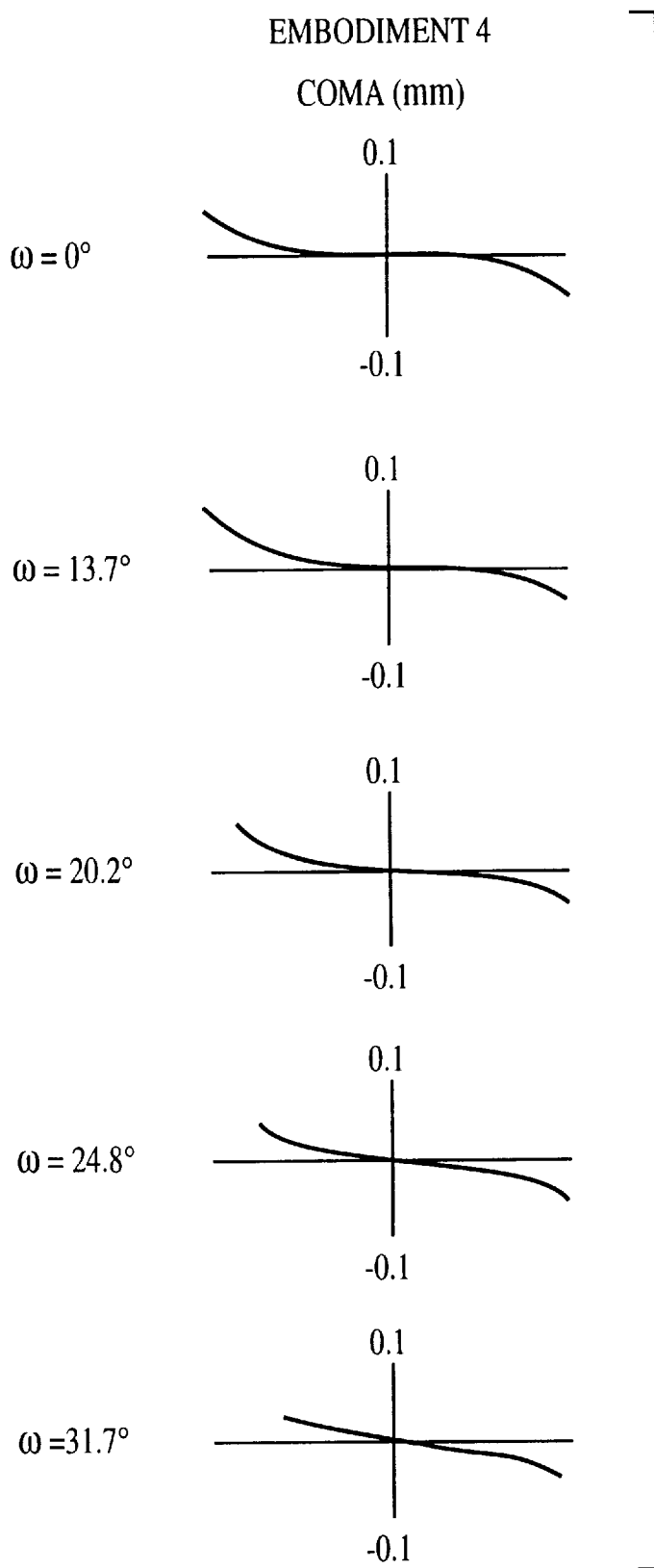
FIG. 9 shows the coma of the lens of Embodiment 4 at various half-image angles ω.

FIG. 1 shows the basic lens element structure that applies to each of Embodiments 1–4. As shown in FIG. 1, the image-forming lens consists of two lens elements $L_1$ and $L_2$. A stop may be installed near the image side of the second lens element $L_2$, so that light flux traveling along the optical axis X from the object side forms an image at the image-forming position P on the plane 1 of the solid state image sensor. Between the second lens element $L_2$ and the plane 1, a filter section 2 may be installed containing a low-pass filter, an infrared cut-off filter, or the like. In the preferred embodiments, the lens elements $L_1$ and $L_2$ are formed of plastic so as to reduce manufacturing costs.

The first lens element $L_1$ has negative refractive power and is a meniscus shape with its convex surface on the object side, and the second lens element $L_2$ has positive refractive power, and is formed as a biconvex lens with surfaces of slightly different radius of curvature near the optical axis. By making the object-side surface of the first lens element $L_1$ be a convex surface, distortion can be well-corrected. Also, in the preferred embodiments, both surfaces of the first lens element $L_1$ and the second lens element $L_2$, namely surfaces 1–4, are made to be aspheric.

The lens of this invention is a reverse telephoto type lens, (i.e., a retro-focus type lens), which provides a sufficient back focus for insertion of an additional component, such as a filter section 2, as illustrated, while at the same time providing a wide image angle. Also, by making the first through fourth lens element surfaces be aspherical, as described above, various aberrations such as distortion, spherical aberration, astigmatism, and coma can reduced, while keeping the number of lens elements limited to two.

When the value in Condition (1) drops below the lower limit, the back focus becomes insufficient for the filter section 2 to be inserted. On the other hand, when the value of Condition (1) exceeds the upper limit, it becomes difficult to correct coma while keeping the distortion low.

When the value in Condition (2) drops below the lower limit, it becomes difficult to correct coma while keeping the distortion small. Also, spherical aberrations increase, making it difficult to provide a lens having a low $F_{NO}$ so as to provide a bright image. On the other hand, when the value in Condition (2) exceeds the upper limit, the back focus becomes insufficient for the filter section 2 to be inserted.

Below, several embodiments of the invention will be set forth with specific numerical data given.

Embodiment 1

Table 1 lists the surface # in order from the object side, the radius of curvature R near the optical axis in mm of each lens element surface, the on-axis surface spacing D in mm, the index of refraction $N_e$ at the e-line, and the Abbe constant $\nu$ for each lens element of Embodiment 1.

TABLE I

| # | R | D | $N_e$ | $\nu$ |
|---|---|---|---|---|
| 1* | 47.302 | 3.0 | 1.52832 | 56.3 |
| 2* | 2.250 | 3.4 | | |
| 3* | 3.639 | 3.8 | 1.49217 | 57.3 |
| 4* | -3.685 | 1.1 | | |
| 5 | ∞ | 1.8 | 1.51825 | 63.8 |
| 6 | ∞ | | | |

Those surfaces with a * to the right of the surface number above are aspherical surfaces, and the aspherical surface shape is expressed by Equation (A), below.

$$Z = CY^2/\{1+(1-KC^2Y^2)^{1/2}\} + A_4Y^4 + A_6Y^6 + A_8Y^8 + A_{10}Y^{10} \quad \text{(Equation A)}$$

where

Z is the length (in mm) of a line drawn from a point on the aspherical surface at distance Y from the optical axis to the tangential plane of the aspherical surface vertex, C (=1/R) is the curvature of the aspherical surface near the optical axis, Y is the distance (in mm) from the optical axis, K is the eccentricity, and $A_4$, $A_6$, $A_8$, and $A_{10}$ are the 4th, 6th, 8th, and 10th aspherical coefficients.

The values of each of the constants K and $A_4$–$A_{10}$ for the aspherical surfaces indicated in Table 1 are shown in Table 2. Also, in the lower section of Table 2 is listed performance data for the lens of this embodiment.

TABLE 2

| # | K | $A_4$ | $A_6$ | $A_8$ | $A_{10}$ |
|---|---|---|---|---|---|
| 1 | 1.0 | $0.8204278 \times 10^{-3}$ | $0.5649331 \times 10^{-7}$ | $0.4339000 \times 10^{-9}$ | $0.7251784 \times 10^{-12}$ |
| 2 | 1.0 | $0.1643034 \times 10^{-2}$ | $-0.1423342 \times 10^{-5}$ | $0.2989712 \times 10^{-9}$ | $0.7053049 \times 10^{-12}$ |
| 3 | 1.0 | $-0.1337734 \times 10^{-2}$ | $-0.1637479 \times 10^{-6}$ | $-0.5269628 \times 10^{-9}$ | $-0.8653037 \times 10^{-12}$ |
| 4 | 1.0 | $0.6737195 \times 10^{-2}$ | $-0.3230320 \times 10^{-6}$ | $-0.5414032 \times 10^{-9}$ | $-0.8746554 \times 10^{-12}$ | f = 4.17  Bf = 7.03  $F_{NO}$ = 2.5  $2\omega$ = 62.8°
$f_1/f$ = -1.10  $D_1/f$ = 0.72

As is apparent from the above performance data, in Embodiment 1 the focal distance f of the image-forming lens is 4.17 mm, the back focus Bf is 7.03 mm, the f-number $F_{NO}$ is 2.5, and the image angle $2\omega$ is 62.8 degrees. Also, the $f_1/f$ value is -1.10 and the $D_1/f$ value is 0.72, which satisfy Conditions (1) and (2), respectively.

Embodiment 2

The image-forming lens elements of Embodiment 2 are similar in basic structure to that of Embodiment 1. Table 3 lists the surface # in order from the object side, the radius of curvature R near the optical axis in mm of each lens element surface, the on-axis surface spacing D in mm, the index of refraction $N_e$ at the e-line, and the Abbe constant $\nu$ for each lens element of Embodiment 2. Those surfaces with a * to the right of the surface number below are aspherical surfaces, and the aspherical surface shape is expressed by Equation (A), above.

TABLE 3

| # | R | D | $N_e$ | $\nu$ |
|---|---|---|---|---|
| 1* | 55.059 | 4.2 | 1.52832 | 56.3 |
| 2* | 2.250 | 3.2 | | |
| 3* | 3.183 | 3.3 | 1.49217 | 57.3 |
| 4* | -3.855 | 0.5 | | |
| 5 | ∞ | 1.8 | 1.51825 | 63.8 |
| 6 | ∞ | | | |

The values of each of the constants K and $A_4$–$A_{10}$ for the aspherical surfaces indicated in Table 3 are shown in Table 4, below. Also, in the lower section of Table 4 is listed performance data for the lens of this embodiment.

TABLE 4

| # | K | $A_4$ | $A_6$ | $A_8$ | $A_{10}$ |
|---|---|---|---|---|---|
| 1 | 1.0 | $0.4520360 \times 10^{-3}$ | $0.6243930 \times 10^{-7}$ | $0.4351808 \times 10^{-9}$ | $0.7253029 \times 10^{-12}$ |
| 2 | 1.0 | $0.1681441 \times 10^{-2}$ | $-0.1423342 \times 10^{-5}$ | $0.2989874 \times 10^{-9}$ | $0.7053432 \times 10^{-12}$ |
| 3 | 1.0 | $-0.1244134 \times 10^{-2}$ | $-0.1625571 \times 10^{-6}$ | $-0.5269314 \times 10^{-9}$ | $-0.8652650 \times 10^{-12}$ |

TABLE 4-continued

| # | K | $A_4$ | $A_6$ | $A_8$ | $A_{10}$ |
|---|---|---|---|---|---|
| 4 | 1.0 | $0.6704745 \times 10^{-2}$ | $-0.3230594 \times 10^{-6}$ | $-0.5413790 \times 10^{-9}$ | $-0.8746168 \times 10^{-12}$ | f = 4.16  Bf = 6.58  $F_{NO}$ = 3.0  2ω = 63.4°
$f_1/f$ = −1.10  $D_1/f$ = 1.02

As is apparent from the above performance data, in Embodiment 2 the focal distance f of the lens is 4.16 mm, the back focus Bf is 6.58 mm, the $F_{NO}$ is 3.0, and the image angle 2 ω is 63.4 degrees. Also, the $f_1/f$ value is −10, and the $D_1/f$ value is 1.02, which satisfy Conditions (1) and (2), respectively.

Embodiment 3

The image-forming lens elements of Embodiment 3 are similar in basic structure to that of Embodiment 1. Table 5 lists the surface # in order from the object side, the radius of curvature R near the optical axis in mm of each lens element surface, the on-axis surface spacing D in mm, the index of refraction $N_e$ at the e-line, and the Abbe constant ν for each lens element of Embodiment 3. Those surfaces with a * to the right of the surface number below are aspherical surfaces, and the aspherical surface shape is expressed by Equation (A), above.

TABLE 5

| # | R | D | $N_e$ | ν |
|---|---|---|---|---|
| 1* | 24.252 | 4.0 | 1.52832 | 56.3 |
| 2* | 2.363 | 4.0 | | |
| 3* | 4.162 | 4.0 | 1.49217 | 57.3 |
| 4* | −3.603 | 1.0 | | |
| 5 | ∞ | 1.8 | 1.51825 | 63.8 |
| 6 | ∞ | | | |

The values of each of the constants K and $A_4$–$A_{10}$ for the aspherical surfaces indicated in Table 5 are shown in Table 6, below. Also, in the lower section of Table 6 is listed performance data for the lens of this embodiment.

As is apparent from the above performance data, in Embodiment 3 the focal distance f of the lens is 4.18 mm, the back focus Bf is 6.97 mm, the $F_{NO}$ is 2.0, and the image angle 2 ω is 62.2 degrees. Also, the $f_1/f$ value is −1.27 and the $D_1/f$ value is 0.96, which satisfy Conditions (1) and (2), respectively.

Embodiment 4

The image-forming lens elements of Embodiment 4 are similar in basic structure to that of Embodiment 1. Table 7 lists the surface # in order from the object side, the radius of curvature R near the optical axis in mm of each lens element surface, the on-axis surface spacing D in mm, the index of refraction $N_e$ at the e-line, and the Abbe constant ν for each lens element of Embodiment 4. Those surfaces with a * to the right of the surface number below are aspherical surfaces, and the aspherical surface shape is expressed by Equation (A), above.

TABLE 7

| # | R | D | $N_e$ | ν |
|---|---|---|---|---|
| 1* | 13.845 | 2.3 | 1.52832 | 56.3 |
| 2* | 2.230 | 3.3 | | |
| 3* | 3.590 | 3.8 | 1.49217 | 57.3 |
| 4* | −3.348 | 1.0 | | |
| 5 | ∞ | 1.8 | 1.51825 | 63.8 |
| 6 | ∞ | | | |

The values of each of the constants K and $A_4$–$A_{10}$ for the aspherical surfaces indicated in Table 7 are shown in Table 8, below. Also, in the lower section of Table 8 is listed performance data for the lens of this embodiment.

TABLE 6

| # | K | $A_4$ | $A_6$ | $A_8$ | $A_{10}$ |
|---|---|---|---|---|---|
| 1 | 1.0 | $0.5025054 \times 10^{-3}$ | $0.8524653 \times 10^{-7}$ | $0.4286111 \times 10^{-9}$ | $0.7110298 \times 10^{-12}$ |
| 2 | 1.0 | $0.1699437 \times 10^{-2}$ | $-0.1429100 \times 10^{-5}$ | $0.2899715 \times 10^{-9}$ | $0.6909234 \times 10^{-12}$ |
| 3 | 1.0 | $-0.1170617 \times 10^{-2}$ | $-0.1668980 \times 10^{-6}$ | $-0.5359315 \times 10^{-9}$ | $-0.8796847 \times 10^{-12}$ |
| 4 | 1.0 | $0.6636607 \times 10^{-2}$ | $-0.3289664 \times 10^{-6}$ | $-0.5503923 \times 10^{-9}$ | $-0.8890365 \times 10^{-12}$ | f = 4.18  Bf = 6.97  $F_{NO}$ = 2.0  2ω = 62.2°
$f_1/f$ = −1.27  $D_1/f$ = 0.96

TABLE 8

| # | K | $A_4$ | $A_6$ | $A_8$ | $A_{10}$ |
|---|---|---|---|---|---|
| 1 | 1.0 | $0.1061004 \times 10^{-2}$ | $0.5417751 \times 10^{-7}$ | $0.4249627 \times 10^{-9}$ | $0.7096641 \times 10^{-12}$ |
| 2 | 1.0 | $0.1801970 \times 10^{-2}$ | $-0.1425480 \times 10^{-5}$ | $0.2892840 \times 10^{-9}$ | $0.6897065 \times 10^{-12}$ |
| 3 | 1.0 | $-0.1826891 \times 10^{-2}$ | $-0.1745450 \times 10^{-6}$ | $-0.5367463 \times 10^{-9}$ | $-0.8809032 \times 10^{-12}$ |
| 4 | 1.0 | $0.7137394 \times 10^{-2}$ | $-0.3267971 \times 10^{-6}$ | $-0.5511439 \times 10^{-9}$ | $-0.8902545 \times 10^{-12}$ |

$f = 4.04$  $Bf = 6.01$  $F_{NO} = 2.56$  $2\omega = 63.4°$
$f_1/f = -1.34$  $D_1/f = 0.57$ As is apparent from the above performance data, in Embodiment 4 the focal distance f of the lens is 4.04 mm, the back focus Bf is 6.01 mm, the $F_{NO}$ is 2.56, and the image angle $2\omega$ is 63.4 degrees. Also, the $f_1/f$ value is $-1.34$ and the $D_1/f$ value is 0.57, which satisfy Conditions (1) and (2), respectively.

The spherical aberration, astigmatism and distortion for each of Embodiments 1–4 are shown in FIGS. 2, 4, 6, and 8, respectively. The coma of Embodiments 1–4 is shown in FIGS. 3, 5, 7, and 9, respectively. In these aberration figures, $\omega$ indicates the half-image angle. As is clear from FIGS. 2–9, each aberration is acceptably low for each embodiment of the invention.

Between this image-forming lens and the image surface on the plane of the solid state image sensor, a cover glass can be inserted in place of the filter section 2, or together with the filter section 2. Furthermore, the plastic lens elements with aspherical surfaces may alternately be formed of glass.

As explained above, according to the image-forming lens of the invention, by employing a retro-focus type lens having a convex surface as the first surface on the object side, and by satisfying two specified conditions, it is possible to simultaneously provide low distortion and a wide image angle while retaining a sufficient back focus for insertion of additional optical components between the lens and the detector array at the image plane, while using a compact, low-cost, two lens element construction. Also, as described above, by making at least one surface of each lens element aspherical, it is possible to improve various aberrations so that a lens having only two lens elements provides a high quality image.

The invention being thus described, it will be obvious that the same may be varied in many ways. Such variations are not to be regarded as a departure from the spirit and scope of the invention. Rather the scope of the invention shall defined as set forth in the following claims and their legal equivalents. All such modifications as would be obvious to one skilled in the art are intended to be included within the scope of the following claims.

What is claimed is:

1. An image-forming lens consisting of no more than two lens elements, as follows, in order from the object side:

a first lens element of negative refractive power and a meniscus shape, with its convex surface on the object side; and a second lens element of positive refractive power and a biconvex shape;

said image-forming lens satisfying the following conditions $$-1.4 \leq f_1/f \leq -1.1$$

$$0.55 \leq D_1/f \leq 1.2$$

where $f_1$ is the focal distance of the first lens element, f is the focal distance of the image-forming lens, and $D_1$ is the on-axis thickness of the first lens element.

2. The image-forming lens as set forth in claim 1, wherein each of the first lens element and the second lens element includes a surface that is aspherical.

* * * * *

UNITED STATES PATENT AND TRADEMARK OFFICE
CERTIFICATE OF CORRECTION

PATENT NO. : 6,104,553
DATED : Aug. 15, 2000
INVENTOR(S) : Nagahara

It is certified that error appears in the above-indentified patent and that said Letters Patent is hereby corrected as shown below:

column 3, line 51 should read:

$$Z = CY^2 / \{1 + (1 - KC^2Y^2)^{1/2}\} + A_4Y^4 + A_6Y^6 + A_8Y^8 + A_{10}Y^{10} \quad \ldots \text{(Equation A)}$$

column 4, line 7, change "A6" to -- $A_6$ --;

column 4, line 31, change "$f_1$/fvalue" to -- $f_1$/f value --;

column 5, line 12 change "Bfis" to -- $B_f$ is --;

column 5, line 13, change "is-10" to -- is -1.10 --; and

Table 8, change "$F_{NO} = 2.56 \quad 2\omega = 63.4°$" to -- $F_{NO} = 2.56 \quad 2\omega = 63.4°$ --.

Signed and Sealed this

Twenty-fourth Day of April, 2001

Attest:

NICHOLAS P. GODICI

*Attesting Officer*    *Acting Director of the United States Patent and Trademark Office*